(12) United States Patent
Chen et al.

(10) Patent No.: US 7,214,083 B2
(45) Date of Patent: May 8, 2007

(54) ELECTRICAL CONNECTOR WITH SHIELDING SHELL

(75) Inventors: Kun-Hua Chen, Tu-Cheng (TW); Yung-Chien Chung, Tu-Cheng (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 11/415,019

(22) Filed: May 1, 2006

(65) Prior Publication Data

US 2006/0246762 A1 Nov. 2, 2006

(30) Foreign Application Priority Data

Apr. 29, 2005 (TW) .............................. 94206866 U

(51) Int. Cl.
*H01R 13/62* (2006.01)

(52) U.S. Cl. ...................... 439/330; 439/73; 439/331; 439/607

(58) Field of Classification Search ................ 439/330, 439/358, 71, 70, 73, 331, 607
See application file for complete search history.

(56) References Cited

U.S. PATENT DOCUMENTS

2005/0048829 A1* 3/2005 Nishio et al. ............... 439/331

FOREIGN PATENT DOCUMENTS

| CN | 3389155 | 9/2004 |
|----|---------|--------|
| TW | M261873 | 4/2005 |

\* cited by examiner

*Primary Examiner*—Javaid H. Nasri
(74) *Attorney, Agent, or Firm*—Wei Te Chun

(57) ABSTRACT

An electrical connector (100) is adapted for receiving a module body (4). The connector comprises a dielectric housing (1), a plurality of contacts (2) and a shielding shell (3). The housing has sidewalls (11, 12) forming a cavity (10) to receive the module body therein. The contacts are disposed on the sidewalls of the housing. The shielding shell has sidewalls (31,32) surrounding the housing and a pair of pressing members (33) and at least two clipping members (34) extending from two opposite sidewalls (32) of the shell. Each pressing member comprises a pressing portion (331) for pressing against a surface (421) of the module body and an operating portion (332) extending upwards from the pressing portion. The at least two clipping members resiliently retain on the sidewalls of the dielectric housing.

20 Claims, 5 Drawing Sheets

ELECTRICAL CONNECTOR WITH SHIELDING SHELL

BACKGROUND OF THE INVENTION

1. Field of the Invention

The present invention relates to an electrical connector, and more particularly to an electrical connector adapted for receiving a module body such as a camera module.

2. Description of the Related Art

Taiwan Patent Number M261873 discloses an electrical connector. Referring to FIGS. 2 and 5 of TW M261873, the connector 5 includes a dielectric housing 51 with four sidewalls and a bottom wall, a plurality of inverted-V-shaped contacts 52 disposed on the sidewalls and a shielding shell 53 surrounding the outer side of the sidewalls. The top edges of shell bend with an arc shape to clip corresponding top edges of the sidewalls of the housing, and four pieces of grounding member 533 bent downward and inwards. A camera module 6 is received in space formed by said five walls of the housing.

However, the shell is not securely retained on the housing only by the arc-shaped top edges. And, the camera module is also not securely received in the housing only by the contacts 52 and the grounding members 533 resiliently engaged with the camera module.

Hence, an improved electrical connector is desired to overcome the above problems.

BRIEF SUMMARY OF THE INVENTION

It is an object of the present invention to provide an electrical connector, which easily and securely receives a module body therein.

In order to obtain the objective above, an electrical connector is adapted for receiving a module body. The connector comprises a dielectric housing, a plurality of contacts and a shielding shell. The housing has sidewalls forming a cavity to receive the module body therein. The contacts are disposed on the sidewalls of the housing. The shielding shell has sidewalls surrounding the housing and a pair of pressing members and at least two clipping members extending from two opposite sidewalls of the shell. Each pressing member comprises a pressing portion for pressing against a surface of the module body and an operating portion extending upwards from the pressing portion. The at least two clipping members resiliently retain on the sidewalls of the dielectric housing.

Other objects, advantages and novel features of the invention will become more apparent from the following detailed description of the present embodiment when taken in conjunction with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

DETAILED DESCRIPTION OF THE INVENTION

Figure 1:
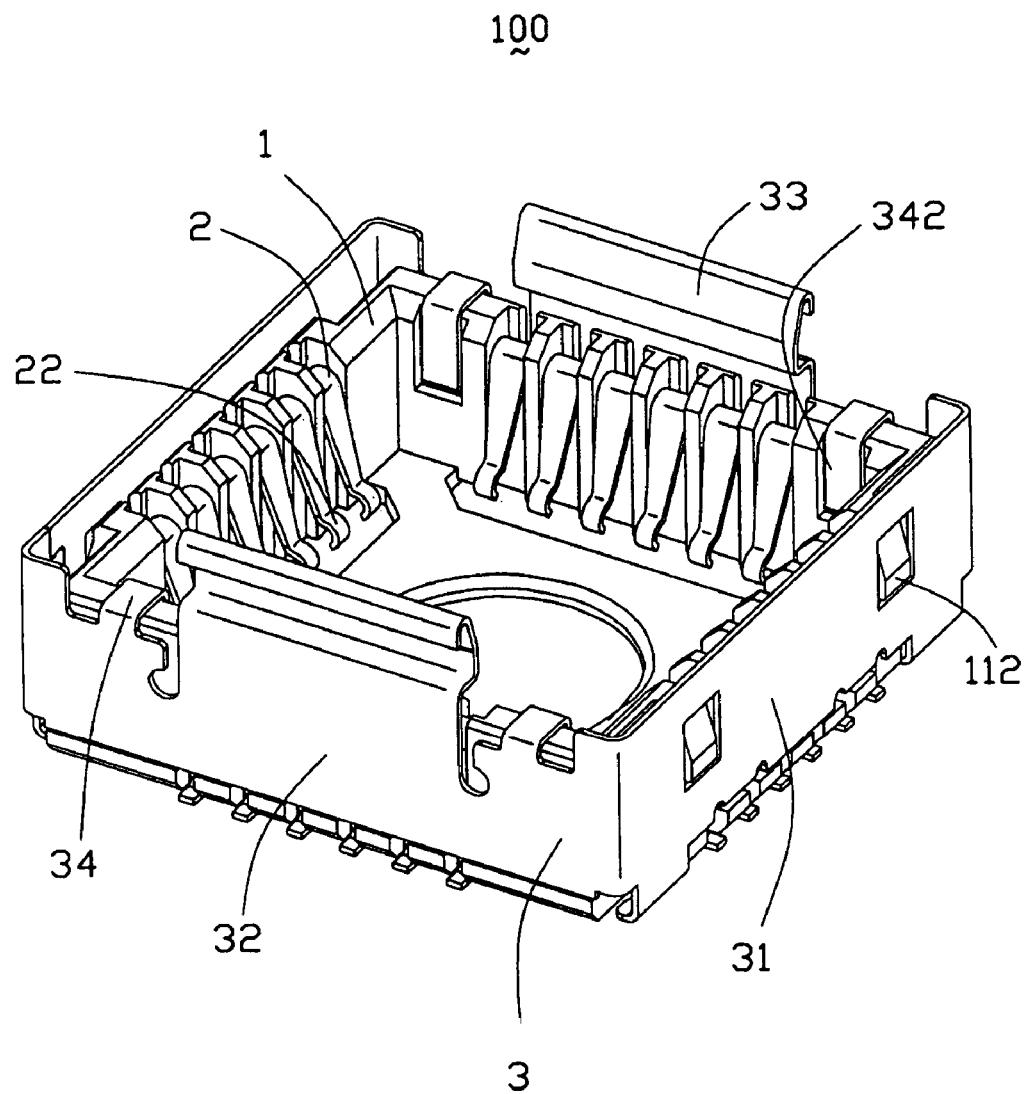
FIG. 1 is a perspective view of an electrical connector according to an embodiment of the present invention.

In the following detailed description, for purposes of explanation, numerous specific details are set forth in order to provide a thorough understanding of the present invention. It will be apparent, however, that the present invention may be practiced without these specific details. In other instances, well-known structures and devices are schematically shown in order to simplify the drawing.

An electrical connector according to the present invention is applicable to electronic apparatuses such as digital cameras, PDAs (Personal Digital Assistances), PCs (Personal Computers), mobile telephones or the like. In the preferred embodiment illustrated in FIGS. 1–5, the electrical connector 100 is used in a mobile handset (not shown) for connecting a module body, such as camera module 4 to an internal PCB (not shown).

Figure 2:
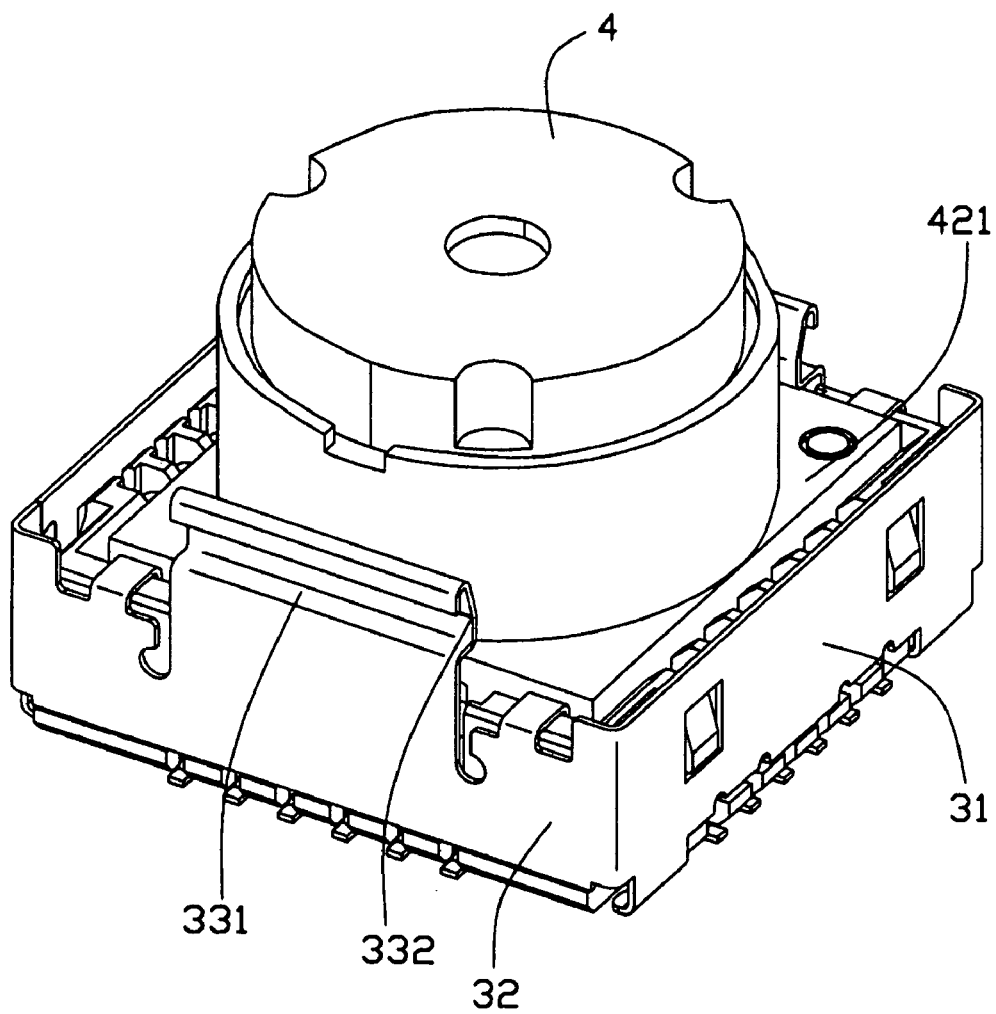
FIG. 2 is a perspective view of the electrical connector with a module body received therein.

Referring to FIGS. 1 and 2, the electrical connector 100 includes a housing 1 for receiving the camera module 4, a plurality of contacts 2 received in the housing 1, and a shielding shell 3 surrounding the housing 1, which not only prevents the connector from EMI but also retains the camera module 4 in the connector 100.

Figure 3:
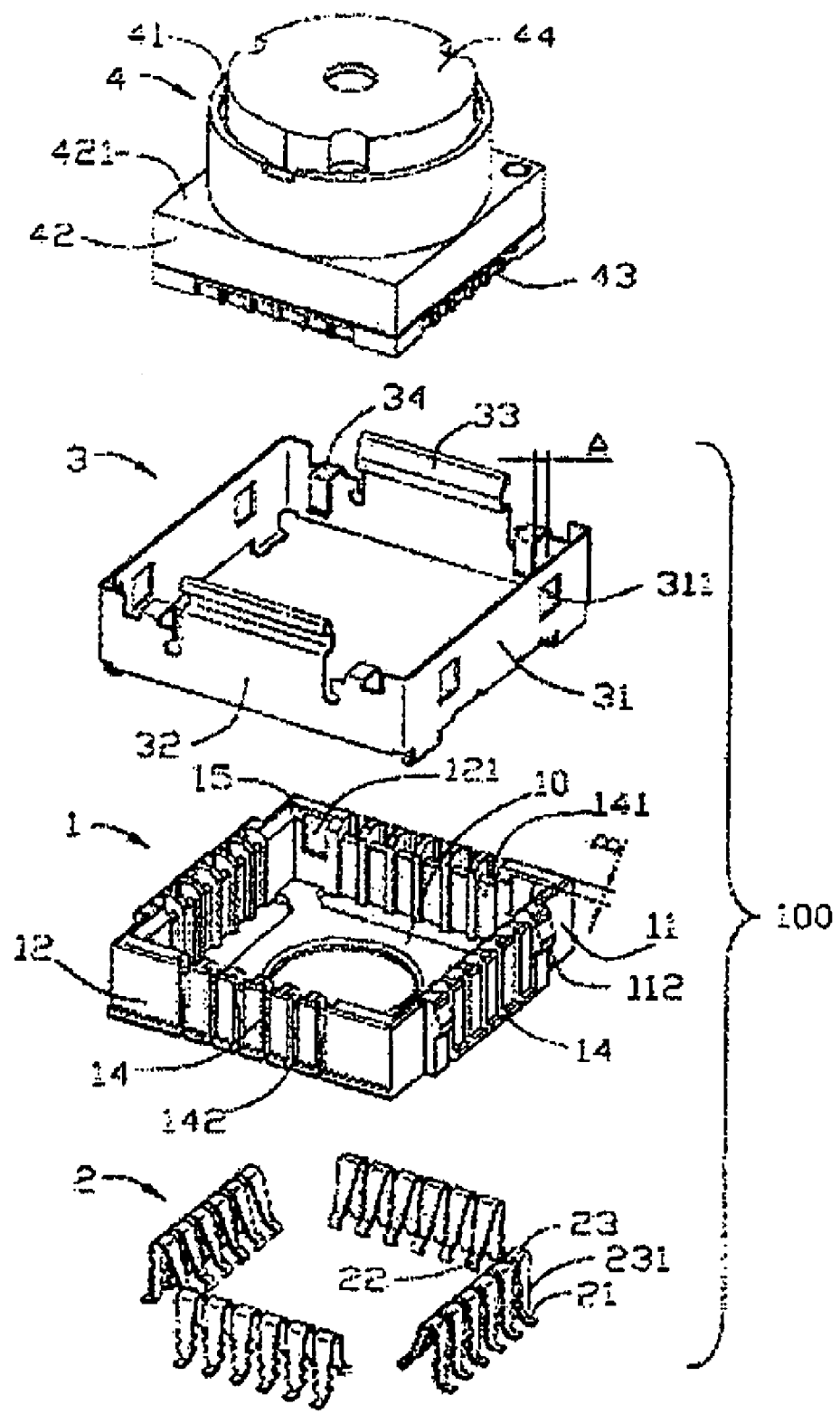
FIG. 3 is an exploded view of the electrical connector with the module body shown in FIG. 2.
Figure 4:
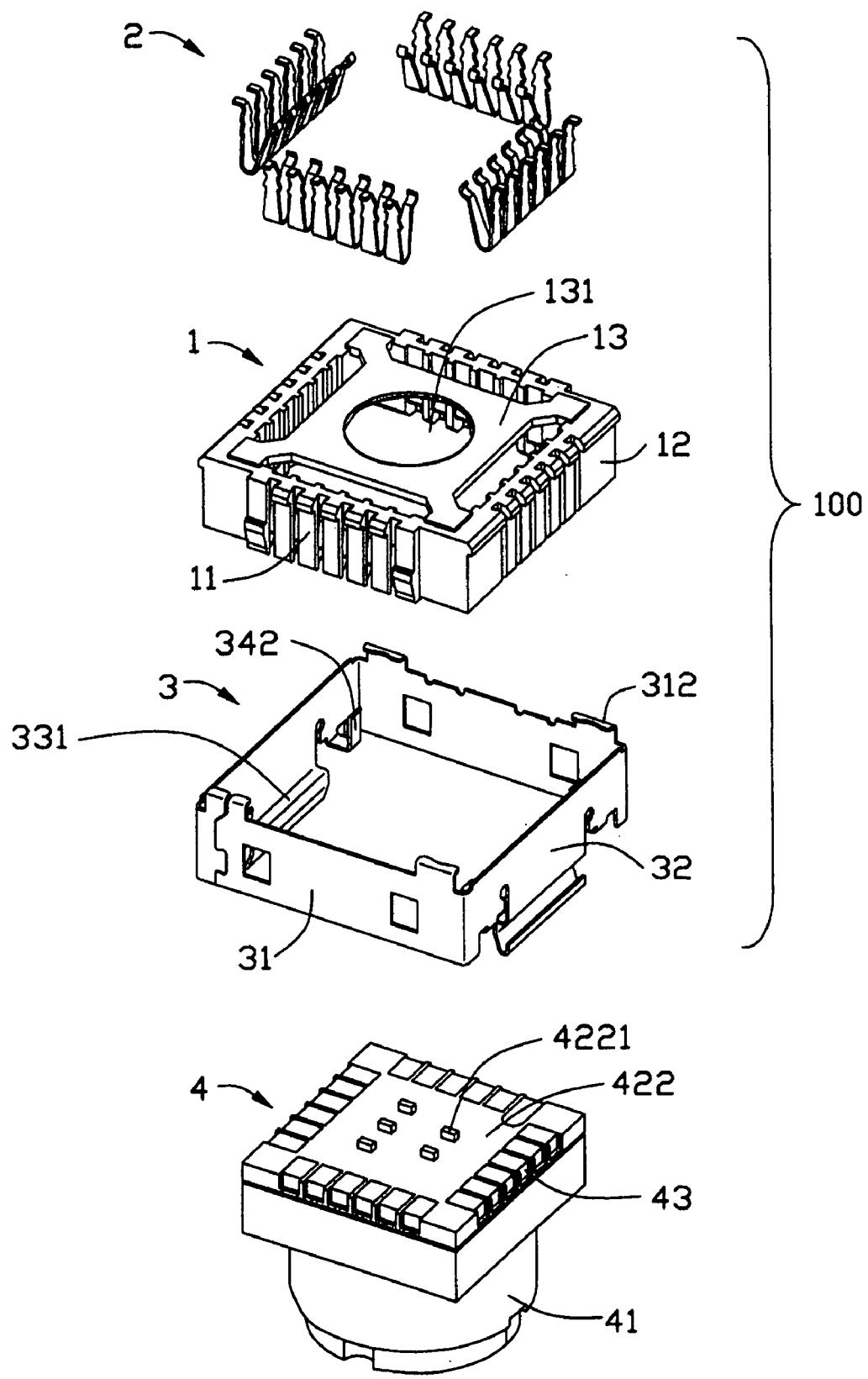
FIG. 4 is another exploded view of the electrical connector with the module body shown in FIG. 2 taken from a bottom aspect.

Referring to FIGS. 3–4, the housing 1 is molded from insulative material and is of squareness frame including two pairs of sidewalls, namely, left and right walls 11, front and rear walls 12, and a bottom wall 13 jointing said four sidewalls. Said five walls form a cavity 10 with upward open for receiving the camera module 4. Each sidewall defines a plurality of upright passageways 14 thereon, each of which includes an inner portion 141 along the inner side and a corresponding outer portion 142 along the outer side thereof. The left and right wall 11 each has two protrusions 112 respectively on two sides of the outer face thereof. The front and rear walls 12 respectively have two recesses 121 on two sides of the inner face thereof. The top edges of four sidewalls have an inward bevel 15.

Each contact 2 has an inverted-V-shaped base portion 23 retained in the passageways 14, with an inner portion received in the inner portion 141 of the passageways and an outer portion having barbs 231 retained in the outer portion 142 of the passageways. Each contact member 2 further has a contact portion 22 with cam shape on the distal end of the inner portion, which slantways extends into the cavity 10, best shown in FIG. 1, and a solder portion 21 extending laterally from the outer portion of base portion 23 for being soldered on the PCB.

Still referring to FIGS. 3–4, the shielding shell 3 is made of metal material and is of squareness frame including four sidewalls, namely, left and right walls 31, front and rear walls 32. The left and right walls 31 respectively define two through slots 311 thereon and two legs 312 on the bottom edges thereof. The front and rear walls 32 respectively define a pair of clipping members 34 and a pressing member 33. The left and right walls 31 is higher than the front and back walls 32. As shown in FIG. 1, the left and right walls 31 of the shell 3 vertically rise beyond the tops of corresponding sidewalls of the housing somewhat. Contrarily, the front and back walls 32 stand lower than corresponding sidewalls of the housing, with its top edges located vertically below corresponding top edges of the sidewalls.

Figure 5:
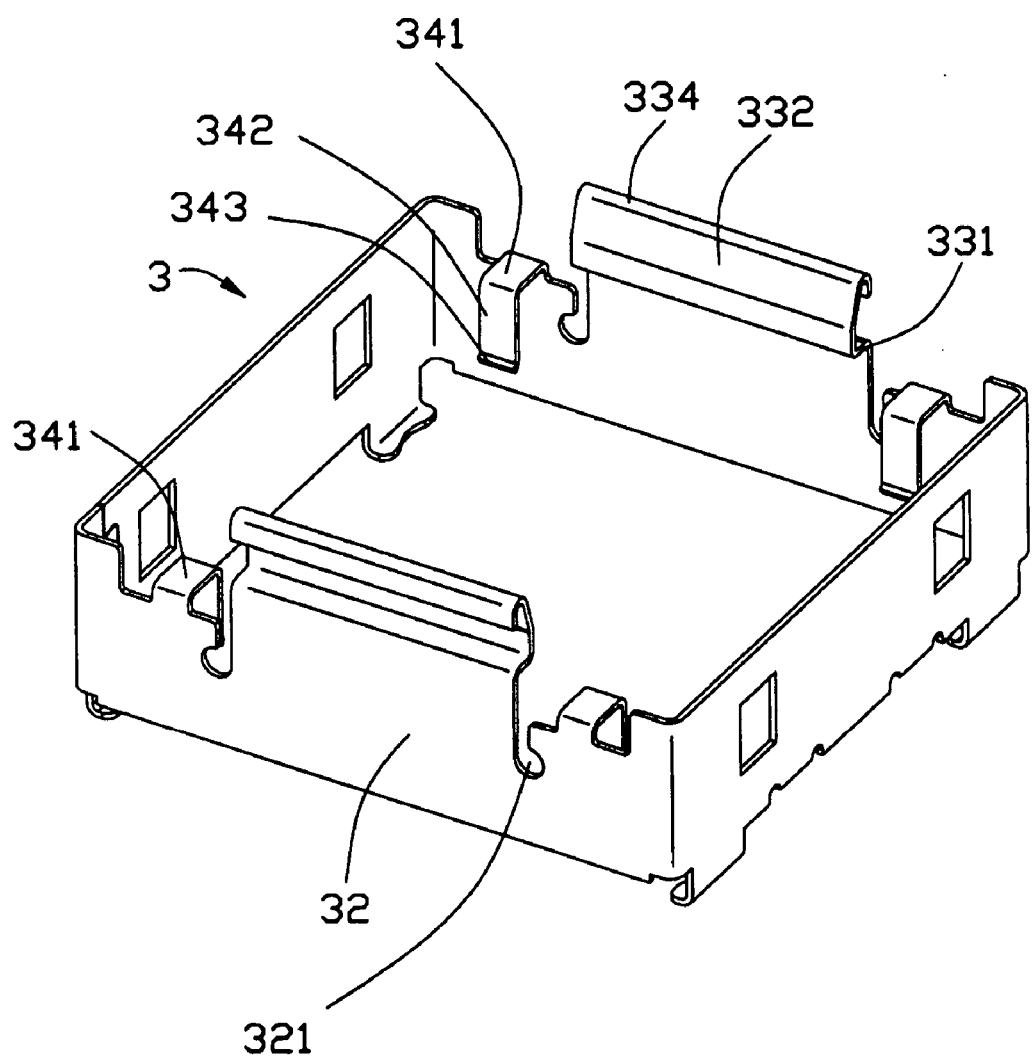
FIG. 5 is a perspective view of the shell of FIG. 3.

Best shown in FIG. 5, each pressing member 33 extends from the top edge, in middle portion, of the sidewalls 32 of shell 3 with channels 321 adjacent to the left and right edges thereof. The channels are approximately half height of the sidewall 32. In other words, the sidewall 32 also can recess downwards to the middle height thereof forming a downward-recess portion, and the pressing member 33 upright rises from the downward-recess portion. The pressing member 33 defines a horizontal, pressing portion 331 and an operating portion 332, which firstly extends upright from the end of the pressing portion 331 and then slants outwards with an outward-arc-shaped distal end 334. The pair of clipping members 34 extend from the top edge of the sidewall 32 and position respectively beside the pressing member 33. Each clipping member 34 defines a horizontal, connecting member 341 and a fastening member 342 extending downwards from the connecting member 341, with a outwards-arc-shaped distal end 343. The shell 3 is assembled onto the dielectric housing 1 with the through slots 311 retained with the protrusions 112, as shown in FIG. 1. A distance A between the sidewall 32 of the shell and the fastening portion 342 is slight smaller than that B between inner surface of the recess 121 and the outer surface of sidewall 12, so the fastening portions 342 can resiliently and tightly press against the inner surface of the recess 121, which will increases the retention of the shell 3 to the housing 1. The outward-arc-shaped distal end 343 is provided to guide the fasten portion 342 in to the recess.

Still referring to FIGS. 3-4, the camera module 4 includes a lower base portion 42 according to the cavity 10 and a hollow column portion 41 above the base portion 42. A plurality of conductive pads 43 is disposed on lower sidewalls of the base portion 42. A lens 44 is disposed in the hollow column portion 41. A plurality of projections 4221 is defined on the bottom side 422 of the base portion 42, which can align with the circular hole 131 on the bottom wall 13 of the housing 1 to assemble the camera module in the housing.

In usage, the connector 100 is mounted on the PCB by soldering the contacts 2 and legs 312 to traces on the PCB. In assembling process of the camera module 4 to the connector 100, the pressing member 33 are deflected outwards by a user's hand or a tool (not shown) pressing on the operating portion 332 and then the lower base member 42 of the camera module 4 is inserted into the cavity 10 until the conductive pads 43 of the camera module 4 engage with the contact member 22 of the connector for establishing an electrical connection therebetween. Last, the pressing members 33 resile to have the horizontal, pressing portion 331 thereof resiliently pressing against the upper surface 421 of the base portion 42, best shown as FIG. 2. The slanting-outwards operating portion 332 is provided not only for the user's operation, but also for guiding the camera module 4 into the cavity 10. The inward bevel 15 on the sidewall of the housing also has the guiding function. The channels 321 are provided to increase the elasticity of the pressing member 33 and avoid interactant of the pressing member 33 and the clipping member 34. The deflection of the pressing member 33 will not impact the clipping member 34.

It is to be understood, however, that even though numerous, characteristics and advantages of the present invention have been set fourth in the foregoing description, together with details of the structure and function of the invention, the disclosed is illustrative only, and changes may be made in detail, especially in matters of number, shape, size, and arrangement of parts within the principles of the invention to the full extent indicated by the broad general meaning of the terms in which the appended claims are expressed.

What is claimed is:

1. An electrical connector adapted for receiving a module body, comprising:
    a dielectric housing having sidewalls forming a cavity to receive the module body therein;
    a plurality of contacts disposed on the sidewalls of the housing;
    a shielding shell defining sidewalls surrounding the housing, a pair of pressing members and at least two clipping members extending from two opposite sidewalls thereof; wherein
    each pressing member comprises a pressing portion for pressing against a surface of the module body and an operating portion extending upwards from the pressing portion, and the at least two clipping members resiliently retain on the sidewalls of the dielectric housing.

2. The electrical connector according to claim 1, wherein said sidewalls of the shielding shell further define a plurality of channels adjacent to left and right edges of the press members.

3. The electrical connector according to claim 1, wherein he pressing portion of the pressing member horizontally bent toward the cavity and the operating portion upright extends from the pressing portion and then slants apart from the cavity.

4. The electrical connector according to claim 1, wherein the at least two clipping members locate beside two sides of the pressing member and adjacent to the channels on each of said sidewalls.

5. The electrical connector according to claim 4, wherein the clipping member comprises a retaining portion and a connecting portion connecting the retaining portion with sidewall of the shell, and said sidewalls of the dielectric housing have corresponding recesses to receive the retaining portion.

6. The electrical connector according to claim 5, wherein a distance between the retaining portion and the corresponding sidewall of the shell is smaller than that between an inner surface of the recess and an outer surface of the sidewall of the housing.

7. The electrical connector according to claim 1, wherein top edges of the sidewalls of the dielectric housing define an inward bevel.

8. The electrical connector according to claim 1, wherein the dielectric housing has protrusions on its sidewalls, and the shielding shell has through slots to be retained with the protrusions of the housing.

9. The electrical connector according to claim 1, wherein the contact is inverted-V-shaped and comprises a base portion secured in the housing, a contact portion with cam shape extending into the cavity of the dielectric housing and a soldering portion extending out of the dielectric housing.

10. An electrical connector adapted for receiving a module body, comprising:
    a dielectric housing comprising sidewalls forming a cavity for receiving the module body;
    a plurality of contacts received in the insulative housing, each contact having a base portion secured in the housing, a contact portion extending into the cavity of the housing and a soldering portion extending out of the dielectric housing;
    a shielding shell comprising sidewall to surround an outer side of the dielectric housing, a pair of opposite sidewalls respectively recessing downwards forming a down-recessing portion; wherein a pressing member upright extends from the down-recessing portion and then perpendicularly bents towards the cavity to form a pressing portion, extending into the cavity for pressing the module body, and an operating portion extends upwards and outwards from the pressing portion.

11. The electrical connector according to claim 10, wherein said opposite sidewalls vertically rise below tops of corresponding sidewalls of the dielectric housing.

12. The electrical connector according to claim 10, wherein said down-recessing portions are approximately half height of the sidewalls of the shielding shell.

13. The electrical connector according to claim 10, wherein the shielding shell further comprises a pair of clipping members beside the pressing portion, and the clipping portions extend from a top of the sidewall thereof and clips the sidewall of the dielectric housing.

14. An electrical connector adapted for receiving a module body, comprising:
a dielectric housing having sidewalls forming a cavity to receive the module body therein;
a plurality of contacts disposed on the sidewalls of the housing;
a shielding shell defining sidewalls surrounding the housing, at least one pressing member and at least one clipping member spaced from said pressing member; wherein the pressing member comprises a pressing portion for pressing against a surface of the module body and an operating portion extending upwards from the pressing portion, and the clipping member resiliently retained on the sidewalls of the dielectric housing; wherein said operating portion and said pressing portion extends oppositely.

15. The electrical connector according to claim 10, wherein the operation portion extends from the pressing member with a free distal end in a cantilever manner.

16. The electrical connector according to claim 15, wherein the operation portion is located outside of the housing.

17. The electrical connector according to claim 15, wherein the operation portion is higher than any other portions of the shielding shell.

18. The electrical connector according to claim 14, wherein the operation portion extends from the pressing member with a free distal end in a cantilever manner.

19. The electrical connector according to claim 18, wherein the operation portion is located outside of the housing.

20. The electrical connector according to claim 15, wherein the operation portion is higher than any other portions of the shielding shell.

* * * * *